(12) United States Patent
Gallant et al.

(10) Patent No.: US 12,455,244 B2
(45) Date of Patent: Oct. 28, 2025

(54) SUBSTRATE WITH MAGNETIC LAYER FOR SERS, METHODS FOR THEIR PREPARATION AND USES THEREOF

(71) Applicants: Stephanie Gallant, Mount Pearl (CA); Erika Merschrod, St. John's (CA)

(72) Inventors: Stephanie Gallant, Mount Pearl (CA); Erika Merschrod, St. John's (CA)

( * ) Notice: Subject to any disclaimer, the term of this patent is extended or adjusted under 35 U.S.C. 154(b) by 560 days.

(21) Appl. No.: 17/309,130

(22) PCT Filed: Oct. 28, 2019

(86) PCT No.: PCT/CA2019/051518
§ 371 (c)(1),
(2) Date: Apr. 28, 2021

(87) PCT Pub. No.: WO2020/087157
PCT Pub. Date: May 7, 2020

(65) Prior Publication Data
US 2022/0011234 A1    Jan. 13, 2022

Related U.S. Application Data

(60) Provisional application No. 62/751,776, filed on Oct. 29, 2018.

(51) Int. Cl.
*G01N 21/65*    (2006.01)
*B82Y 15/00*    (2011.01)
*G01N 33/18*    (2006.01)

(52) U.S. Cl.
CPC ........... *G01N 21/658* (2013.01); *G01N 33/18* (2013.01); *B82Y 15/00* (2013.01)

(58) Field of Classification Search
CPC ...... G01N 21/658; G01N 33/18; B82Y 15/00; B82Y 20/00
See application file for complete search history.

(56) References Cited

U.S. PATENT DOCUMENTS 5,721,102 A * 2/1998 Vo-Dinh ............. C12Q 1/6825
435/6.12
5,866,430 A * 2/1999 Grow ............... G01N 35/00009
436/172

(Continued)

FOREIGN PATENT DOCUMENTS

CN          108318421 A      7/2018
EP          3073251 A1       9/2016
WO    WO-2007095058 A2 *    8/2007  ............. A01N 59/16
WO    WO-2014146115 A2 *    9/2014  ............. B29C 33/56

OTHER PUBLICATIONS

Machine Translation of She et al. in Foreign Patent Document CN 108318421 A (Year: 2018).*

(Continued)

*Primary Examiner* — Mi'schita' Henson
(74) *Attorney, Agent, or Firm* — SMART & BIGGAR LP

(57) ABSTRACT

The present application relates, for example, to substrates for surface enhanced Raman spectroscopy (SERS), to methods for their preparation and to uses of such SERS substrates in methods for the detection of an analyte in a sample. The SERS substrates of the present application comprise a support material, a layer of a SERS-active metal on the support material, and a layer of magnetically active nanoparticles on the layer of the SERS-active metal. The methods of preparing such SERS substrates comprise depositing a layer of a SERS-active metal on a support material, and depositing a layer of magnetically active nanoparticles on the layer of the SERS-active metal.

19 Claims, 10 Drawing Sheets

(56) References Cited

U.S. PATENT DOCUMENTS

| | | | |
|---|---|---|---|
| 7,242,470 B2* | 7/2007 | Cullum | G01N 21/658 |
| | | | 356/301 |
| 8,003,408 B2 | 8/2011 | Zhang et al. | |
| 8,149,397 B2 | 4/2012 | Lee et al. | |
| 8,298,392 B2* | 10/2012 | Dorairaj | C07K 1/26 |
| | | | 204/601 |
| 8,363,215 B2 | 1/2013 | Henry et al. | |
| 9,134,247 B2 | 9/2015 | Sengupta et al. | |
| 9,276,063 B2 | 3/2016 | Zhang et al. | |
| 9,360,429 B2* | 6/2016 | Li | G01N 21/658 |
| 2008/0266555 A1* | 10/2008 | Murphy | B82Y 30/00 |
| | | | 428/323 |
| 2017/0000910 A1* | 1/2017 | Cormode | A61K 49/0466 |
| 2018/0209836 A1* | 7/2018 | Lu | C12M 1/34 |
| 2021/0190774 A1* | 6/2021 | Huang | G01N 33/54346 |

OTHER PUBLICATIONS

International Search Report and Written Opinion of corresponding PCT Application No. PCT/CA2019/051518 dated Feb. 4, 2020.

Gallant, S.M.V. et al., "Hierachical Magnetic Films for High-Performance Plasmonic Sensors", Langmuir, ACS Publications, Nov. 24, 2021, vol. 37, pp. 14043-14049. https://doi.org/10.1021/acs.langmuir.1c02078.

Sahoo, Y. et al., "Field-Directed Self-Assembly of Magnetic Nanoparticles", J. Phys. Chem. B., American Chemical Society, Feb. 20, 2004, vol. 108, No. 11, pp. 3380-3383. https://doi.org/10.1021/jp031148i.

* cited by examiner

SUBSTRATE WITH MAGNETIC LAYER FOR SERS, METHODS FOR THEIR PREPARATION AND USES THEREOF

CROSS-REFERENCE TO RELATED APPLICATIONS

The present application is a National Stage of co-pending International Application No. PCT/CA2019/051518 filed Oct. 28, 2019, which claims the benefit of priority from U.S. provisional application No. 62/751,776 filed on Oct. 29, 2018, the contents of each of which are incorporated herein by reference in their entirety.

The present application relates to substrates for surface enhanced Raman spectroscopy (SERS), to methods for their preparation and to uses of such SERS substrates in methods for the detection of an analyte in a sample.

BACKGROUND

Traditionally, the most sensitive and robust methods for organic contamination in water have been chromatographic methods such as gas chromatography-mass spectrometry (GC-MS). This technique excels, for example, at complete speciation and quantification. However, it is a technically demanding analytical method which also requires significant sample preparation time. In some industries such as the oil production industry, complete speciation of the water has been sacrificed in lieu of speed and ease of detection.

In the offshore oil industry in Newfoundland and Labrador, real time monitoring is employed as a first line detection method using fluorescence-based spectroscopic methods. However, a significant drawback to fluorescence measurements is that there is no chemical speciation occurring, i.e. the individual components present in the observed waste stream are not able to be identified prior to discharge. A second method that is employed is an ultraviolet-visible (UV-Vis) photospectroscopic method that also suffers from a lack of specificity.

Surface enhanced Raman scattering (SERS) can provide structural information about an analyte and can permit trace analyses due to enhancement of Raman scattering of compounds which are adsorbed to certain surfaces. Such SERS substrates have included magnetic core-shell sensors (i.e. nanoparticles with a core made up of magnetic/iron oxide) having a plasmonic material shell and layered structures comprising a plasmonic material deposited as the frontier layer over a base layer of nanoparticles. Other SERS substrates are known which comprise, for example, rough metal surfaces or nanostructures.

For example, U.S. Pat. No. 9,134,247 discloses a method and apparatus comprising a first SER-active material, of which a support structure is comprised and a second SER-active material comprising a liquid reagent. An analyte-specific binding agent is attached to at least one of the first or second SER-active material. The method comprises adding the analyte sample to one (or both) of the functionalized SER-active materials then adding the liquid reagent (second SER-active material) to the support structure (first SER-active material) such that the SER-active materials are attached to the target analyte. U.S. Pat. No. 8,149,397 discloses nanostructured SERS probes that are in the form of a spherical, asymmetrical tapered metallic shell having a round opening surrounded by an edge that can optionally comprise layers of different metals e.g. of gold and iron. U.S. Pat. No. 7,242,470 discloses SERS substrates which can comprise a metal film over a nanostructured layer. U.S. Pat. No. 8,003,408 discloses SERS active particles which include a gold nanoparticle coated with very fine iron oxide nanoparticles.

SUMMARY

In contrast to prior SERS substrates, the SERS substrates of the present application employ a magnetic top layer which enhances signal through a magnetic field and promotes adhesion of certain classes of compounds that may, for example, be advantageous for using such SERS based materials for organic contamination analysis. Lab trials have indicated that the SERS substrates prepared in the present examples had a high affinity towards the types of organic contamination which are of significant industrial concern due to regulatory and compliance requirements. The SERS substrates may, for example, be competitive in cost, speed and ease of analysis, while also offering rich speciation which may afford an end user more overall information regarding their production system and/or their waste water discharge.

Accordingly, the present application includes a substrate for surface enhanced Raman spectroscopy (SERS), comprising:
  a support material;
  a layer of a SERS-active metal on the support material; and
  a layer of magnetically active nanoparticles on the layer of the SERS-active metal.

The present application also includes a method of preparing a substrate for surface enhanced Raman spectroscopy (SERS), comprising:
  depositing a layer of a SERS-active metal on a support material; and
  depositing a layer of magnetically active nanoparticles on the layer of the SERS-active metal.

The present application also includes a use of a SERS substrate of the present application for detecting and/or quantifying an analyte as well as a method for detecting an analyte in a sample, the method comprising:
  contacting a SERS substrate of the present application with the sample to adhere the analyte to the SERS substrate;
  obtaining a SERS spectrum of the analyte adhered to the SERS substrate; and
  analyzing the spectrum to detect the analyte.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
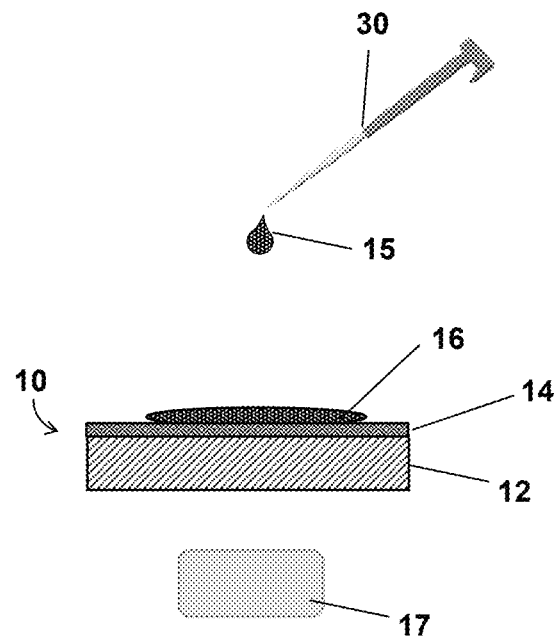
FIG. 1 is a schematic of an exemplary embodiment of depositing a layer of magnetically active nanoparticles comprising depositing a portion of a suspension comprising magnetically active nanoparticles and a solvent on the layer of SERS-active metal using a suitable strong permanent magnet.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least 5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise.

The term "suitable" as used herein means that the selection of specific reagents or conditions will depend on the reaction being performed and the desired results, but nonethe-less, can generally be made by a person skilled in the art once all relevant information is known.

The term "produced water" as used herein refers to waste water generated during the production of oil and/or natural gas. Produced water may include water from the reservoir, water that has been injected into the formation and/or chemicals added during production/treatment. Produced water may include organic compounds such as various polycyclic aromatic hydrocarbons (PAHs), BTEX (benzene, toluene, ethylbenzene and xylene), triterpanes, ketones, saturated hydrocarbons, phenols and/or organic acids which may be detectable by SERS.

The term "magnetically active" as used herein in reference to nanoparticles refers to nanoparticles that are ferrimagnetic or ferromagnetic and does not include nanoparticles that are diamagnetic, paramagnetic or antiferromagnetic.

The term "alkyl" as used herein, whether it is used alone or as part of another group, means straight or branched chain, saturated alkyl groups. The term $C_{1-6}$alkyl means an alkyl group having 1, 2, 3, 4, 5 or 6 carbon atoms.

II. SERS Substrates and Methods for the Preparation Thereof

Highly sensitive magnetically active SERS substrates have been prepared that may, for example, be capable of detecting a wide variety of Raman-active compounds such as common organic pollutants in water used during industrial processes. The SERS substrates have been used to detect organic contamination present in laboratory simulated solutions (1 ppm phenanthrene) and raw produced water samples (sourced from a local oil production platform). The SERS substrates prepared and tested were made up of a 5 nm gold ($Au^0$) film which was deposited onto a well-cleaned glass slide via a metal sputtering system. The Au film$^0$ was then thermally annealed for 2 hours at 300° C. to serve as the sensor enhancement layer of the SERS substrate. The adhesion layer of the SERS substrate was formed by sequential deposition of portions of organosilane capacitated ferrimagnetic iron nanoparticles (FeNPs) of approximately 30-60 nm diameter, or uncapped ferrimagnetic cobalt iron oxide nanoparticles (CoFeNPs), where the majority was approximately 30-60 nm diameter, with some particles being 100-300 nm. Deposition thickness was monitored via Raman spectroscopy until underlying glass slide fluorescence was quenched via nanoparticle (NP) addition. This resulted in the sensing device composed of a glass slide with a $Au^0$ film enhancement layer covered via a magnetic nanoparticle adhesion layer. This represents an inversion of a typical SERS substrate which has the metal enhancement layer as the top layer of the device.

Accordingly, the present application includes a substrate for surface enhanced Raman spectroscopy (SERS), comprising:
  a support material;
  a layer of a SERS-active metal on the support material; and
  a layer of magnetically active nanoparticles on the layer of the SERS-active metal.

The support material is any suitable support material. For example, the person skilled in the art would appreciate that a suitable support material is a solid material that would not significantly affect the overall plasmonic behaviour of the layer of the SERS-active metal and is advantageously robust enough to be handled by means such as tweezers, by hand or with a robotic instrument. In an embodiment, the support material comprises, consists essentially of or consists of glass, plastic, silicon or highly oriented pyrolytic graphite (HOPG). In an embodiment, the support material comprises, consists essentially of or consists of glass or plastic. In another embodiment of the present application, the support material comprises, consists essentially of or consists of glass.

The support material (probe) can be of any shape or dimension as long as it has a flat area of at least 1 mm$^2$ coated with the layers of SERS-active metal and magnetically active nanoparticles. The thickness of the support material can be any suitable thickness may result. In an embodiment of the present application, the support material has a thickness of from about 1.0 mm to about 1.2 mm.

The SERS substrate tested in the examples of the present application used gold as the SERS active metal. However, other metals such as platinum, silver and copper may also be suitable alternatives in that they have demonstrated SERS properties. Accordingly, in some embodiments, the SERS-active metal is gold, platinum, silver or copper. In another embodiment of the present application, the SERS-active metal is gold.

The thickness of the layer of the SERS-active metal may, for example, depend on the detector. For example, based on an 830 nm detector, a layer in the range of about 2.5 nm to about 30 nm would be suitable. Accordingly, in an embodiment, the layer of the SERS-active metal has a thickness of from about 2.5 nm to about 30 nm. In another embodiment of the present application, the layer of the SE RS-active metal has a thickness of about 2.5 nm to about 20 nm or about 2.5 nm to about 7.5 nm. In a further embodiment, the layer of the SERS-active metal has a thickness of about 5 nm.

The SERS substrates tested in the examples of the present application used ferrimagnetic iron oxide or cobalt iron oxide nanoparticles. However, other suitable ferrimagnetic or ferromagnetic nanoparticles may also be used. In an embodiment, the magnetically active nanoparticles comprise iron oxide. In another embodiment of the present application, the magnetically active nanoparticles are ferrimagnetic iron (II,III) oxide nanoparticles, ferrimagnetic iron (III) oxide (γ form) nanoparticles or ferrimagnetic cobalt iron oxide nanoparticles. In another embodiment, the magnetically active nanoparticles are ferrimagnetic iron oxide nanoparticles or cobalt iron oxide nanoparticles. In a further embodiment, the magnetically active nanoparticles are ferrimagnetic iron oxide nanoparticles. In another embodiment, the magnetically active nanoparticles are ferrimagnetic cobalt iron oxide nanoparticles.

The person skilled in the art would readily appreciate that as the diameter of the magnetically active nanoparticles is varied, this will have an effect on the plasmonic behaviour of the material. For example, if the material has poor light absorption, a significant decrease in enhancement or potentially loss of detectable SERS activity. Additionally, at sizes of greater than 100 nm, additional properties of the particles themselves will be altered. Accordingly, in an embodiment, the magnetically active nanoparticles have an average diameter of about 100 nm or less. In another embodiment, the magnetically active nanoparticles have an average diameter of from about 30 nm to about 60 nm.

In some embodiments, the magnetically active nanoparticles are capped. For example, in embodiments wherein the magnetically active nanoparticles are comprised of a material which may undergo oxidation under the conditions in which the SERS substrate would be stored or used, capping of the nanoparticles may reduce or prevent such oxidation such that magnetism is substantially maintained. The magnetically active nanoparticles can be capped by any suitable capping reagent. For example, a person skilled in the art would readily understand that the capping agent doesn't interfere with the magnetic properties or reactivity of the magnetically active nanoparticles. In the examples described hereinbelow, (3-aminopropyl)triethoxysilane was demonstrated to be a suitable capping agent for the iron oxide nanoparticles. In contrast, in similar experiments, (3-mercaptopropyl)trimethoxysilane was found not to be a suitable capping agent. Accordingly, in some embodiments, the capping agent is amine-terminated. In some embodiments, the capping agent is devoid of a mercapto group. In some embodiments, for example, in the case of iron oxide nanoparticles or similar nanoparticles, the capping reagent can have a siloxy functional group which can undergo hydrolysis such that the silane moiety binds to the surface of the nanoparticles via an —O—Si bond, and optionally self-hydrolyze on the surface of the nanoparticles to provide a multilayer coating on the nanoparticles. In an embodiment, the siloxy functional group has the formula —Si(OR$^A$)$_3$ wherein each R$^A$ is independently C$_{1-6}$alkyl. In another embodiment, each R$^A$ is ethyl. In another embodiment, the capping reagent further comprises a primary amine functional group. In another embodiment, the capping agent has the formula H$_2$N—(CH$_2$)$_n$—Si(OR$^A$)$_3$ wherein n is an integer of from between 2 and 10 and R$^A$ is as defined herein. In another embodiment, n is 3. In a further embodiment, the magnetically active nanoparticles are capped by (3-aminopropyl)triethoxysilane. In alternative embodiments, the magnetically active nanoparticles are uncapped.

In an embodiment, the layer of the magnetically active nanoparticles has a thickness such that a Raman spectrum of the SERS substrate does not show any detectable bands corresponding to the support material.

In an embodiment, the SERS substrate is configured for use in a handheld Raman spectrometer, a portable Raman spectrometer or a benchtop Raman spectrometer. In another embodiment, the substrate is configured for use in a handheld Raman spectrometer or a portable Raman spectrometer. A person skilled in the art could readily configure the SERS substrate for use in various Raman spectrometers, for example, based on the focal length of the probe (i.e. the distance between the substrate and the device for a particular spectrometer.

The present application also includes a method of preparing a substrate for surface enhanced Raman spectroscopy (SERS), comprising:

depositing a layer of a SERS-active metal on a support material; and depositing a layer of magnetically active nanoparticles on the layer of the SERS-active metal.

The SERS-active metal can be deposited on the support material by any suitable means. In an embodiment, the SERS-active metal is deposited on the support material by a method comprising thermal evaporation or sputtering. In another embodiment, the SERS-active metal is deposited on the support material by a method comprising sputtering. In another embodiment of the present application, the method further comprises annealing the SERS-active metal prior to depositing the layer of the magnetically active nanoparticles thereon.

In an embodiment, the layer of magnetically active nanoparticles is deposited on the layer of the SERS-active metal by a method comprising:

depositing a portion of a suspension comprising magnetically active nanoparticles and a solvent on the layer of SERS-active metal;

evaporating the solvent; and repeating the depositing and evaporating until a layer of magnetically active nanoparticles of a desired thickness has been deposited on the layer of SERS-active metal.

The deposition of the suspension can be carried out by any suitable means, the selection of which can be made by a person skilled in the art. In an embodiment, the portion is an aliquot of from about 10 µL to about 30 µL or about 20 µL of the suspension. In another embodiment, the method further comprises using a suitable strong permanent magnet (for example, a suitable rare-earth magnet such as a neodymium permanent magnet) beneath the support material during the deposition of the suspension and evaporation. FIG. 1 shows an exemplary embodiment of depositing a layer of magnetically active nanoparticles on the layer of SERS-active metal comprising depositing by suitable means (30) of a portion of a suspension comprising magnetically active nanoparticles and a solvent (15) on the layer of SERS-active metal (14) on the support material (12) using a suitable strong permanent magnet (17) to form the layer of magnetically active nanoparticles (16) of an exemplary SERS substrate (10) of the present application.

In an embodiment, the strong permanent magnet is a neodymium permanent magnet.

In an embodiment, the desired thickness is such that a Raman spectrum of the SERS substrate does not show any detectable bands corresponding to the support material.

In some embodiments, the method further comprises capping the magnetically active nanoparticles to obtain capped magnetically active nanoparticles prior to deposition on the layer of the SERS-active metal. For example, in embodiments wherein the magnetically active nanoparticles are comprised of a material which may undergo oxidation under the conditions in which the SERS substrate would be stored or used, capping of the nanoparticles may reduce or prevent such oxidation such that magnetism is substantially maintained. In an embodiment, the magnetically active nanoparticles are capped by a method comprising mixing a suspension comprising the magnetically active nanoparticles in a suitable solvent (e.g. ethanol) with a suitable amount of a capping agent (e.g. APTES) under suitable conditions to obtain the capped magnetically active nanoparticles. In an embodiment, the conditions comprise agitating (e.g. stirring) the mixture of the magnetically active nanoparticle suspension and the capping agent for a time and at a temperature for the capping to be complete, for example, in the case of APTES or a similar capping agent, a time of from about 1 hour to about 6 hours or about 2 hours at a temperature of about 60° C. to about 100° C. or about 80° C. In alternative embodiments, the method is devoid of a capping step.

It will be appreciated by a person skilled in the art that embodiments relating to the SERS substrates in the methods for preparing the SERS substrates of the present application can be varied as described herein for the embodiments of the SERS substrates of the present application.

For example, in an embodiment of the methods for preparing the SERS substrates, the magnetically active nanoparticles are ferrimagnetic iron oxide nanoparticles having an average diameter of about 100 nm or less. In an embodiment, the magnetically active nanoparticles are ferrimagnetic iron oxide nanoparticles having an average diameter of from about 30 nm to about 60 nm. In another embodiment, the magnetically active nanoparticles are ferrimagnetic cobalt iron oxide nanoparticles, wherein the majority of the magnetically active nanoparticles have a diameter of about 100 nm or less. In an embodiment, the magnetically active nanoparticles are ferrimagnetic cobalt iron oxide nanoparticles, wherein the majority of the magnetically active nanoparticles have a diameter of from about 30 nm to about 60 nm. In an embodiment, the magnetically active nanoparticles are ferrimagnetic cobalt iron oxide nanoparticles, wherein at least about 70% of the magnetically active nanoparticles have a diameter of about 100 nm or less. In an embodiment, the magnetically active nanoparticles are ferrimagnetic cobalt iron oxide nanoparticles, wherein at least about 75% of the magnetically active nanoparticles have a diameter of about 100 nm or less. In an embodiment, the magnetically active nanoparticles are ferrimagnetic cobalt iron oxide nanoparticles, wherein the at least about 70% of the magnetically active nanoparticles have a diameter of from about 30 nm to about 60 nm. In an embodiment, the magnetically active nanoparticles are ferrimagnetic cobalt iron oxide nanoparticles, wherein the at least about 75% of the magnetically active nanoparticles have a diameter of from about 30 nm to about 60 nm.

It will be appreciated by a person skilled in the art that the diameter of the magnetically active nanoparticles may be affected by the reaction conditions, for example, the temperature of the reaction and/or scaling the reaction up or down wherein, for example, reaction vessel size could be a factor.

In another embodiment, the SERS active metal is gold.

The present application also includes a substrate for surface enhanced Raman spectroscopy (SERS) prepared by a method for preparing a substrate for surface enhanced Raman spectroscopy (SERS) of the present application.

III. Uses and Methods for Detecting an Analyte

SERS substrates were prepared that were made up of a glass slide with a gold film enhancement layer that was subsequently covered with a magnetic iron nanoparticle adhesion layer. This represented an inversion of a typical SERS substrate which has the enhancement layer as the top layer of the device. The SERS substrates of the present application can be used in conjunction with an optical based Raman spectroscope to measure various compounds of interest adhered to the sensing surface. The SERS substrates are low cost, disposable and may, for example be used for rapid and accurate detection of organic contamination present, for example in waste water streams.

Accordingly, the present application also includes a use of a SERS substrate of the present application for detecting and/or quantifying an analyte.

The present application also includes a method for detecting an analyte in a sample, the method comprising:
contacting a SERS substrate of the present application with the sample to adhere the analyte to the SERS substrate;
obtaining a SERS spectrum of the analyte adhered to the SERS substrate; and
analyzing the spectrum to detect the analyte.

It will be appreciated by the skilled person that embodiments relating to the SERS substrates in the uses and methods for detecting and/or quantifying an analyte in a sample of the present application can be varied as described herein for the embodiments of the SERS substrates of the present application.

Figure 2:
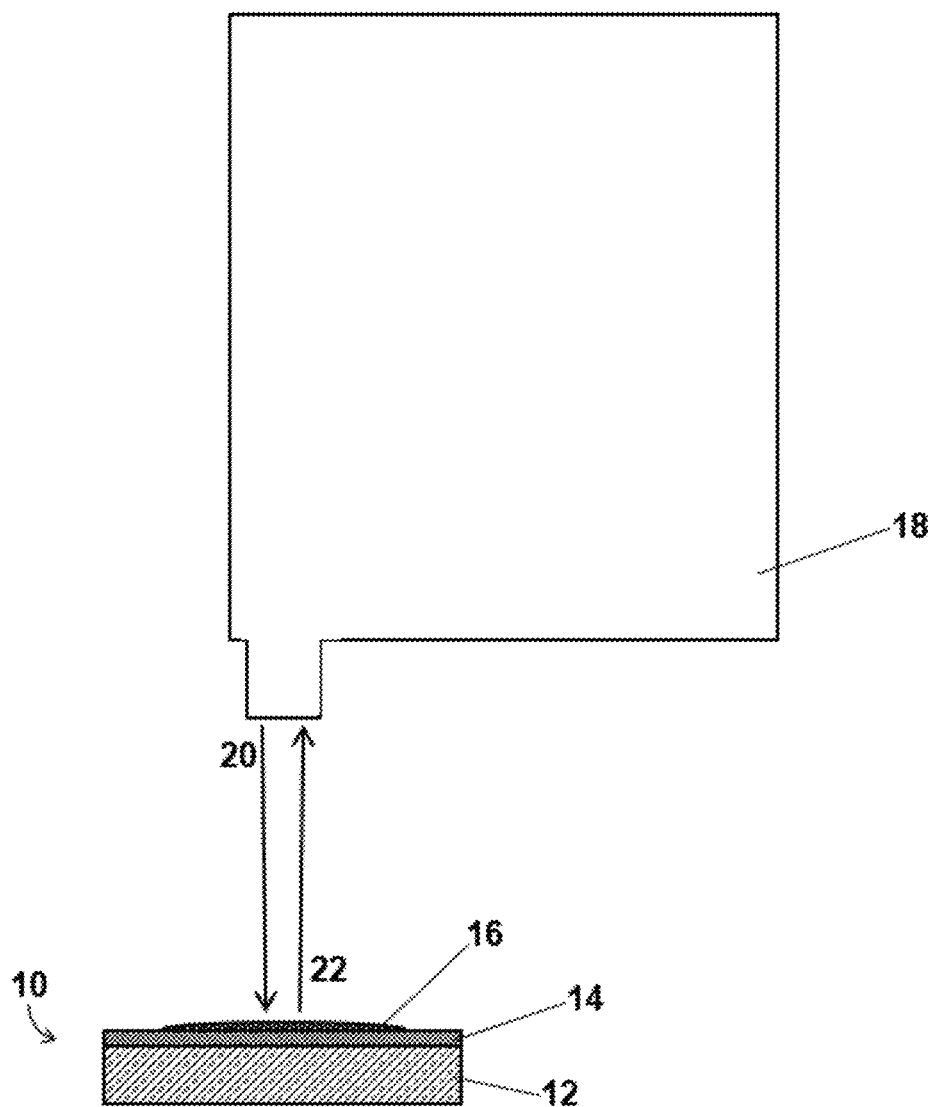
FIG. 2 is a schematic of an exemplary embodiment of a SERS substrate of the present application in use with a Raman spectrometer.

It will be appreciated by a person skilled in the art that the SERS spectrum is obtained via a suitable Raman spectrometer, for example a handheld or portable instrument or a more traditional benchtop Raman instrument. FIG. 2 shows a schematic of an exemplary embodiment of a SERS substrate of the present application 10 comprising a support material 12, a layer of a SERS-active metal 14 on the support material 12 and a layer of magnetically active nanoparticles 16 on the layer of the SERS-active metal 14 with a sample deposited thereon (not shown) in use with a Raman spectrometer 18. Referring to FIG. 2, a laser beam 20 travels to the SERS substrate, light interacts with the sample and the light with a new energy 22 is collected in the detector of the Raman spectrometer 18. A handheld or portable Raman system may be advantageous, for example, due to its mobility and/or smaller laboratory footprint (i.e. a handheld instrument will take up less valuable space in a lab setting). There would be, however, no significant difference in the data collected from either type of instrument. Accordingly, in an embodiment, the SERS spectrum is obtained using a handheld Raman spectrometer, a portable Raman spectrometer or a benchtop Raman spectrometer. In another embodiment of the present application, the SERS spectrum is obtained using a handheld Raman spectrometer or a portable Raman spectrometer.

Figure 3:
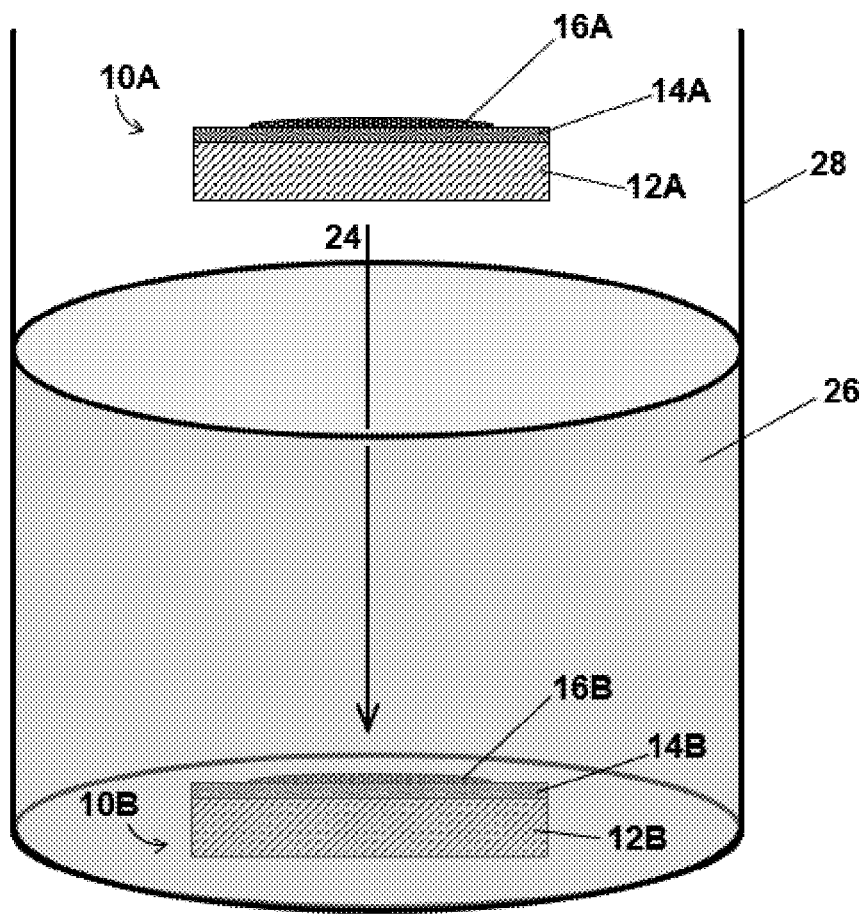
FIG. 3 is a schematic of an exemplary embodiment of a method for detecting an analyte in a sample of the present application comprising submerging at least a portion of a SERS substrate of the present application in the sample.
Figure 4:
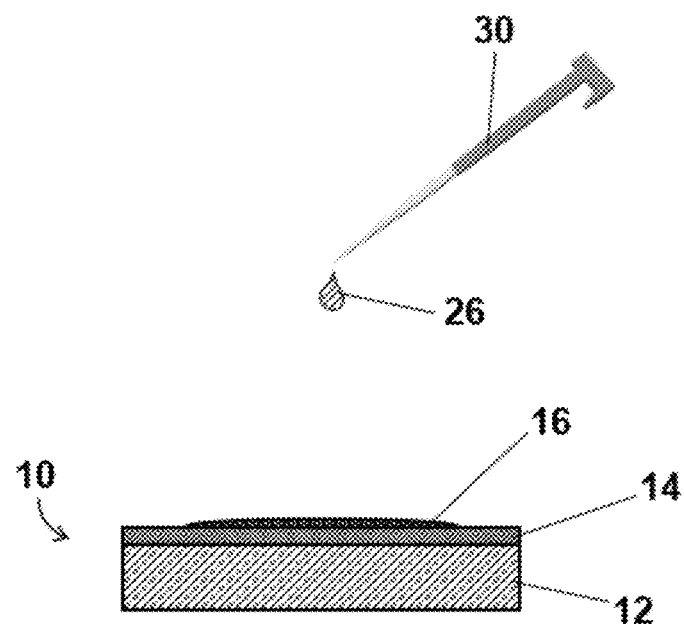
FIG. 4 is a schematic of an exemplary embodiment of a method for detecting an analyte in a sample of the present application comprising depositing at least a portion of the sample onto a SERS substrate of the present application.

The SERS substrates of the present application can be advantageously used to detect analytes without the need for complex and/or time-consuming sample preparation. In an embodiment, the contacting comprises submerging at least a portion, optionally all of the SERS substrate in the sample followed by drying to adhere the analyte to the SERS substrate. FIG. 3 shows a schematic of an exemplary embodiment wherein the contacting comprises submerging at least a portion of the SERS substrate in the sample. Referring to FIG. 3, in the embodiment shown therein, a SERS substrate of the present application (10A, 10B) comprising a support material (12A, 12B), a layer of a SERS-active metal (14A, 14B) on the support material (12A, 12B) and a layer of magnetically active nanoparticles (16A, 16B) on the layer of the SERS-active metal (14A, 14B) is fully submerged 24 in the sample 26 which is housed in a suitable vessel 28. In an embodiment, the at least a portion of the SERS substrate is submerged in the sample for a time of up to about ten minutes. In an alternative embodiment, the contacting comprises depositing the sample on at least a portion of the SERS substrate followed by drying to adhere the analyte to the SERS substrate. FIG. 4 shows a schematic of an exemplary embodiment wherein the contacting comprises depositing the sample on at least a portion of the SERS substrate. Referring to FIG. 4, in the embodiment shown therein, a portion of the sample 26 is deposited by a suitable means 30 onto a SERS substrate of the present application 10 comprising a support material 12, a layer of a SERS-active metal 14 on the support material 12 and a layer of magnetically active nanoparticles 16 on the layer of the SERS-active metal 14. The drying is not shown in FIG. 3 or 4. The drying is carried out by any suitable means, the selection of which can be made by a person skilled in the art. In an embodiment, the drying is carried out under ambient conditions. In another embodiment, the conditions for drying further comprise the use of a fan to accelerate evaporation.

In an embodiment, the spectrum is obtained by placing the SERS active substrate with the analyte adhered thereto in the path of a Raman laser and acquiring the spectrum in a wavenumber range of from about 200 $cm^{-1}$ to about 2000 $cm^{-1}$. Such a spectral acquisition typically takes about three minutes to complete. Acquiring spectra from multiple spots on the surface of the SERS substrate may, for example, provide a more accurate sense of the analyte(s) in the sample. Accordingly, in another embodiment, the spectrum is acquired from a plurality (e.g. three) locations on the surface of the SERS substrate. In another embodiment, the analyzing comprises comparing the Raman shifts of the spectrum to a library of known Raman shifts to identify the analyte in the sample.

In an embodiment, the spectra is sent electronically to a separate location for analysis. In an embodiment, the analysis is qualitative. In another embodiment of the present application, the analysis is quantitative.

In an embodiment, the method further comprises obtaining a SERS spectrum of a SERS substrate without analyte adhered thereto to obtain a blank spectrum then subtracting the blank spectrum from the SERS spectrum obtained of the analyte adhered to the SERS substrate.

In an embodiment, the analyte is a known analyte or has been identified and the analyzing comprises:
calculating the peak area of a diagnostic peak in the spectrum; and
comparing the calculated peak area to a calibration curve of peak areas for that diagnostic peak as a function of concentration of analyte to quantify the amount of the analyte in the sample.

In another embodiment, the sample comprises an unknown analyte and the analyzing comprises:
adding a desired amount of a stock solution comprising a known concentration of a known analyte to the sample;
calculating the peak area of a diagnostic peak in the spectrum for the known analyte;
calculating the peak area of a diagnostic peak for the unknown analyte; and
comparing the calculated peak area of the unknown analyte to the peak area of the known analyte to quantify the amount of the unknown analyte in the sample.

The SERS substrates of the present application may be used for detection of organic contamination in water by a variety of end users. For example, the SERS substrates may be used by an assortment of industries including but not limited to oil production, mining and/or pharmaceuticals. Such large industrial sectors all have a demonstrated need for water monitoring programs and desire reliable and cost-effective methods to accomplish this. Accordingly, in an embodiment, the sample is wastewater. In another embodiment, the wastewater is from oil production, mining or pharmaceutical industry. In a further embodiment of the present application, the wastewater is produced water. The SERS substrates may, for example also be of interest to quickly diagnose water potability and suitability for consumption. For example, such SERS substrates may, for example be advantageously used in rural areas where regular laboratory facilities are not present to quickly determine whether water was suitable for consumption. This simple method of analysis may allow an untrained person to collect the data and determine rapidly whether organic contamination is present within their source. Accordingly, in another embodiment, the sample is drinking water.

The following non-limiting examples are illustrative of the present application:

EXAMPLES

Example 1: General Preparation of SERS Substrates with Organosilane Capacitated Ferrimagnetic Iron Nanoparticles (FeNPs)

I. Materials

Substrate preparation: Glass microscope slides, diamond-tipped scribe, nano-pure water, 12 M hydrochloric acid (HCl), 18 M sulfuric acid ($H_2SO_4$), 95% Ethanol (EtOH), hot plates, Pyrex™ containers (for oil baths), Eppendorf pipette (20 μL delivery) and tips, and small neodymium (Nd) magnets (3 p.c., 18×3 mm).

Reactants for iron oxide nanoparticle preparation: Ferric chloride hexahydrate (Sigma Aldrich), Ferrous chloride tetrahydrate (Sigma Aldrich), concentrated ammonium hydroxide (Fisher Scientific), hydrochloric acid (Fisher Scientific), (3-aminopropyl)triethoxysilane (APTES) (Sigma Aldrich), 95% ethanol (Sigma Aldrich) and nano-pure water.

II. Methods

Washing slides: Separate baths of concentrated $H_2SO_4$ and HCl were prepared in dishes and each warmed on hot plates in a fume hood to approximately 50 degrees Celsius. Glass microscope slides were cut into thirds using a diamond scribe. In a single layer, the cut slides were placed in the warm HCl bath for about 5-10 minutes. The slides were then individually removed and dipped in a beaker of nano-pure water. The slides were then placed in the warm $H_2SO_4$ bath in a single layer for another 5-10 minutes before being individually removed and dipped in a beaker of nano-pure water. The cleaned slides were stored in the EtOH prior to being used in the gold coating step.

Gold coating slides: A slide was removed from the EtOH and dried with a Kimwipe™. The slide was then rinsed well with EtOH and then dried under a flow of clean, dry air. The dried slide was placed on a stage inside a metal sputterer (Quorum Technologies K550X Sputter Coater), numbered side down. The sputterer was turned on and the argon tank valve opened. The sputterer current to was set to 20 mA for 1 minute. This corresponds to a gold deposition thickness of 5 nm. The vacuum chamber was then closed and the procedure started. Once the gold coating was complete, the gold-coated slide was carefully removed, touching the surface at little as possible and was stored in slide box or flat Pyrex dish with Parafilm™ prior to being used in the annealing step.

Annealing gold-coated slides: A tube furnace was set to 300° C. and the gold-coated slides arranged in a single file in the glass tube, gold side up. The gold-coated slides were left in the oven to anneal for 2 hrs. The oven was then turned off to let the glass cool. The annealed slides were stored in a slide box, or a Pyrex dish with Parafilm prior to being used in further steps.

Iron oxide nanoparticle (NP) preparation: The NP reactions were carried out under $N_2$ or another inert gas atmosphere, both the synthesis reaction and coating reaction. The molar ratio of $Fe^{3+}:Fe^{2+}$ used was 3:2, with 50 mmol iron total. Nanoparticle formation can, for example, be affected by reaction vessel size, which could, for example, be a factor in scaling the reaction up or down. See, for example: Milosevic et al., "Magnetic metrology for iron oxide nanoparticle scaled-up synthesis" *RSC Adv.*, 2014, 4, 49086-49089 (doi:10.1039/C4RA08944H) and Cui et al., "Structure switch between $\alpha$-$Fe_2O_3$, $\gamma$-$Fe_2O_3$ and $Fe_3O_4$ during the large scale and low temperature sol-gel synthesis of nearly monodispersed iron oxide nanoparticles" *Advanced Powder Technology* 2013, 24:1, 93-97 (doi:10.1016/j.apt.2012.03.001) for exemplary large scale syntheses of iron oxide nanoparticles.

Synthesis of iron NPs: In a 150 mL or 250 mL beaker under constant stirring with an about 2 cm long magnetic stir bar under an inert environment, about 8.11 g of $FeCl_3 \cdot 6H_2O$ and about 3.99 g $FeCl_2 \cdot 4H_2O$ were added to 50 mL of 2M HCl (made with nano-pure $H_2O$). The solution was heated gently (i.e. temperature kept under 100° C.) throughout. Once the salts had dissolved while still stirring, concentrated $NH_4OH$ (about 25-50 mL) was added slowly, until the reaction reached a pH of 11. Dark brown/black nanoparticles immediately formed upon reaction. Shiny islands may form on the surface of the solution but this will be removed with washing steps. This mixture was allowed to stir and heat for about 30-60 minutes. When complete, the stir bar was removed so as to avoid losing too much product (which was also magnetic), by using a wash bottle to rinse as the bar was brought out of the mixture. The reaction mixture containing NPs was separated into 20 mL scintillation vials for the washing step. The NPs were washed at least 3× with 95% EtOH, using the small magnets to collect solids at the bottom of vials while decanting the supernatant solution off. To retain as much product as possible, decanting was not carried out until the solution was clear. After each addition of EtOH, the vial was shaken to suspend NPs and then the vials were sonicated for about 10 minutes, then these steps repeated. After washings were complete, about 10 mL of EtOH was added to each vial, the NPs suspended by shaking, and the contents of all vials recombined into one beaker to ensure the same concentration was in each. The contents were then redistributed back into the individual vials.

Organosilane coating reaction: In a beaker under inert atmosphere, 1 mL of the iron NP solution prepared in the previous step was added to 50 mL of EtOH, while constantly stirring and heating (at a temperature of about 80° C.). 100 μL of APTES was then rapidly added to the reaction vessel and the reaction allowed to heat and stir for about 2 hours. The washing steps outlined above for the synthesis of the iron NPs were then repeated. After washing, the NPs were stored in about 10 mL of EtOH prior to being used in the deposition step.

Figure 5:
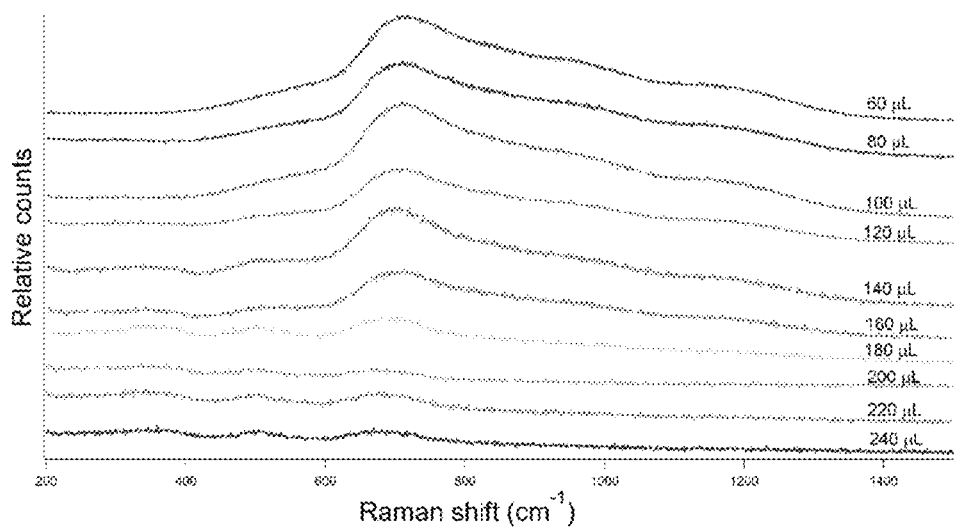
FIG. 5 shows the Raman spectra of a substrate with increasing layers of iron oxide nanoparticles deposited thereon (from top to bottom: 60, 80, 100, 120, 140, 160, 180, 200, 220 and 240 µL of iron oxide nanoparticle suspension added) according to embodiments of the present application.

Depositing FeNP layers: The annealed gold-coated substrate was placed face-up on an Nd magnet stack. A vial of APTES-coated iron oxide nanoparticles was shaken well before use to ensure the nanoparticles were well suspended. 20 μL of NPs were then delivered onto the substrate, depositing manually around the entire area of magnet (not only in the middle of the substrate) and this layer allowed to dry completely. The deposition and drying was repeated until about 160 μL of NPs had been added. At this point, the substrate was checked via Raman scans to see if the large glass fluorescence band around about 800 $cm^{-1}$ was still present. The 20 µL additions and drying were continued, checking with Raman throughout, until the fluorescence band disappeared, and instead the iron profile became apparent (three broad peaks at roughly 700 cm$^{-1}$, 500 cm$^{-1}$, and 350 cm$^{-1}$). Typically, between a total of 200-300 µL of iron oxide NP solution was added. This approximately corresponds to 3-5 mg of iron oxide NP. FIG. 5 shows exemplary Raman spectra of iron oxide NP. At approximately 180 µL of nanoparticles added, Raman peaks for the iron oxide start to appear at around 500 and 350 cm$^{-1}$. This provides a spectral cue that the appropriate amount of nanoparticle has been added to the substrate.

Example 2: General Preparation of SERS Substrates with Uncapped Ferrimagnetic Cobalt Iron Oxide Nanoparticles (CoFeNPs)

I. Materials

The materials for substrate preparation were in line with those described above in Example 1.

Reactants for cobalt iron oxide nanoparticle preparation: Ferric chloride hexahydrate (Sigma Aldrich), Cobalt chloride hexahydrate (Sigma Aldrich), concentrated ammonium hydroxide (Fisher Scientific), 95% ethanol (Sigma Aldrich) and nano-pure water.

II. Methods

The methods for washing slides, gold coating slides and annealing the gold-coated slides were in line with those described above in Example 1.

Cobalt iron oxide nanoparticle (NP) preparation: The NP reactions were carried out in open air. The molar ratio of $Fe^{3+}:Co^{2+}$ used was 2:1.

Synthesis of cobalt iron oxide NPs: In a 150 m L or 250 m L beaker under constant stirring with an about 5 cm long magnetic stir bar, about 37.8 g of $FeCl_3 \cdot 6H_2O$ and about 16.6 g $FeCl_2 \cdot 4H_2O$ were added to 100 mL of nano-pure water. The solution was heated gently (i.e. temperature kept around 80° C.) throughout. Once the salts had dissolved while still stirring, concentrated $NH_4OH$ (about 25-50 mL) was added slowly, until the reaction reached a pH of 11. Dark brown/black solids immediately formed upon reaction. This mixture was allowed to stir and heat for about 90 minutes. When complete, the stir bar was removed by using a wash bottle to rinse as the bar was brought out of the mixture. The reaction mixture containing NPs was separated into 50 mL centrifuge tubes for the washing step. The NPs were centrifuged 3× with nano-pure water, decanting the supernatant each time and sonicating in fresh solution to re-suspend the solids. At the end of sufficient washing steps, the supernatant will be a clear colourless solution. The product was collected and dried in an oven overnight to remove the solvent. Once dried, the solid black product was annealed in a tube furnace at 600° C. for 9-10 hours. The final solid after this annealing was ferrimagnetic and responded to external magnetic force. The CoFeNPs were not capped.

Depositing CoFeNP nanoparticle layers: The annealed gold-coated substrate was placed face-up on an Nd magnet stack. A vial of cobalt iron oxide nanoparticles (NP) was shaken well before use to ensure the nanoparticles were well suspended. 20 µL of NPs were then delivered onto the substrate, depositing manually around the entire area of magnet (not only in the middle of the substrate) and this layer allowed to dry completely. The deposition and drying was repeated until about 160 µL of NPs had been added. At this point, the substrate was checked via Raman scans to see if the large glass fluorescence band around about 800 cm$^{-1}$ was still present. The 20 µL additions and drying were continued, checking with Raman throughout, until the fluorescence band disappeared, and instead the cobalt iron profile (seven broad peaks at 222 cm$^{-1}$, 290 cm$^{-1}$, 409 cm$^{-1}$, 470 cm$^{-1}$, 558 cm$^{-1}$, 612 cm$^{-1}$, and 676 cm$^{-1}$) became apparent. Typically, between a total of 400-500 µL of cobalt iron oxide was added. This approximately corresponds to 1-2 mg of cobalt iron oxide NPs. Accordingly, a spectral check with the cobalt iron profile for preparing the SERS substrate with the CoFeNP can be used similar to the spectral check described above in Example 1 using the iron profile for preparing the SERS substrate with the FeNPs.

Example 3: Detection of Organic Compounds Using SERS Substrates

I. General Experimental Procedure

Using a Renishaw in Via confocal Raman system, coupled with an 830 nm diode laser, all Raman scans were performed using a 45 second exposure time at 1% laser power on the 20-times objective lens of the microscope stand. A SERS spectrum of a blank (unexposed) magnetically active SERS substrate prepared as described in Example 1 was taken. A small volume of analyte solution was then dropped onto the substrate and allowed to air dry. Alternatively, the substrate was submerged in the analyte solution for a short period of time and then removed and allowed to dry. Once dried, a series of SERS spectra were taken using the same Raman settings as above. The substrate blank spectrum can then be subtracted from the analyte spectra.

II. Results and Discussion

Figure 6:
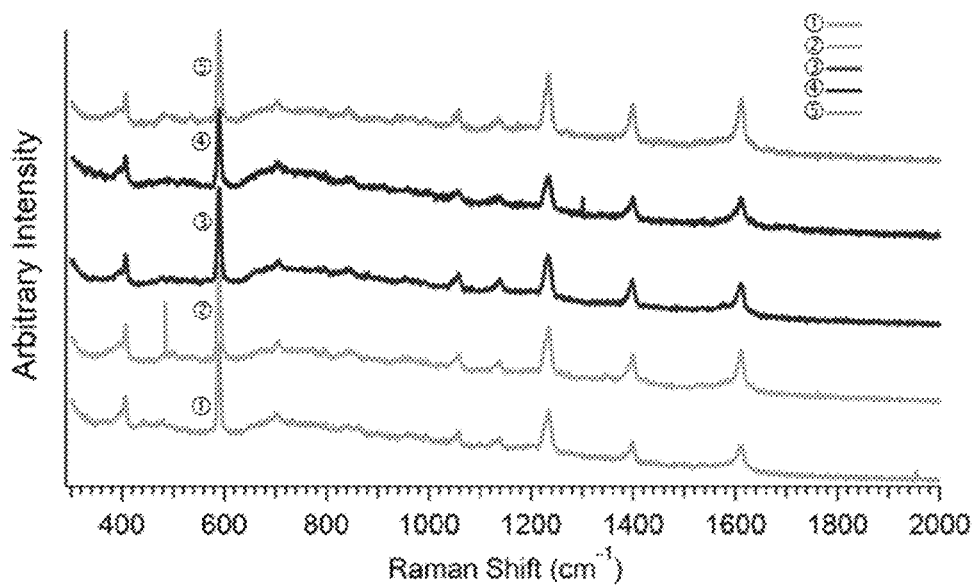
FIG. 6 shows SERS spectra obtained of a 1 ppm phenanthrene solution from five different spots of a SERS substrate that it was deposited on according to an embodiment of the present application.

Once the iron peaks were dominant in the Raman spectra of the SERS substrates prepared as described in Example 1, an analyte solution can be drop cast onto the iron area and allowed to completely dry. Raman analysis can then immediately follow. This method was used to obtain SERS spectra of a 1 ppm phenanthrene solution (FIG. 6). Spectra were taken across a total of twelve different spots on the substrate, with five spots (1-5) visualized in FIG. 6. The results indicated good reproducibility across varying locations on the substrate. The peaks situated at approximately 500 cm$^{-1}$ in spot 2, 1280 cm$^{-1}$ in spot 4, and 1960 cm$^{-1}$ in spot 1 are the result of cosmic radiation interference, and not from the sample or the SERS substrate itself.

Figure 7:
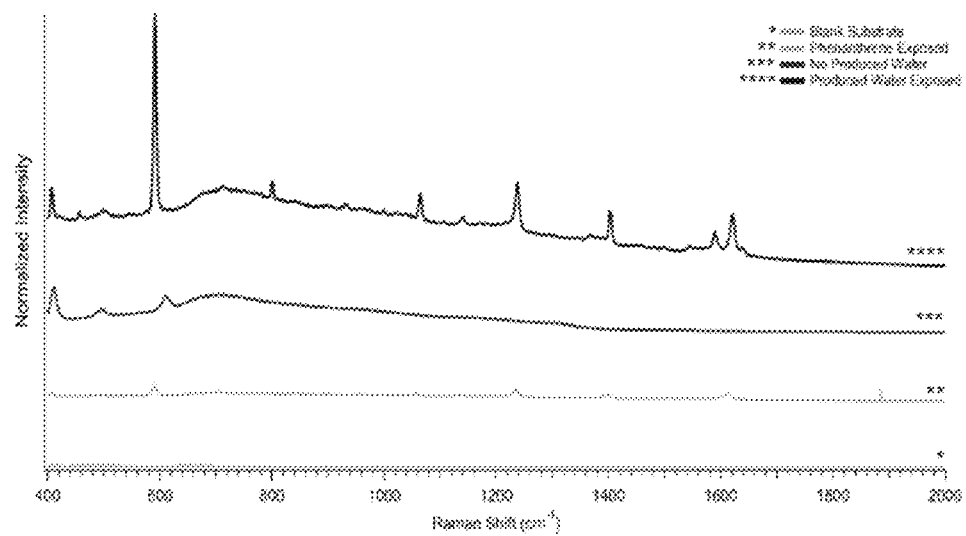
FIG. 7 shows SERS spectra obtained using a SERS substrate according to an embodiment of the present application pre-exposure (\*\*\*) and post-exposure (\*\*\*\*) to offshore oil produced water in comparison to a blank (\*) and exposure to a 1 ppm phenanthrene solution (\*\*).

The use of the SERS substrate of Example 1 to detect the components of a produced water sample (from a local oil production platform) was also examined. SERS spectra are shown in FIG. 7. A substrate blank (spectrum labelled *) was first taken, followed by exposure to a 1 ppm phenanthrene solution (spectrum labelled ). The substrate was then stored for 239 days without washing. Upon receiving a fresh sample of offshore oil produced water, the substrate's ability to detect the components of the water, which are often in the ppb-ppm concentration range was tested by using the same substrate. It was first scanned again (spectrum labelled *) and was then submerged in the produced water for 10 minutes, removed, and allowed to air dry before re-scanning. Numerous peaks appeared corresponding to various components of the produced water sample (spectrum labelled **). The produced water peaks are easily identified in FIG. 7** which can facilitate determining individual contaminants. This spectral output can be deconvoluted and individual components are identified to fully characterize and quantify the components present within the produced water using the magnetic SERS substrate and Raman method of detection.

Figure 8:
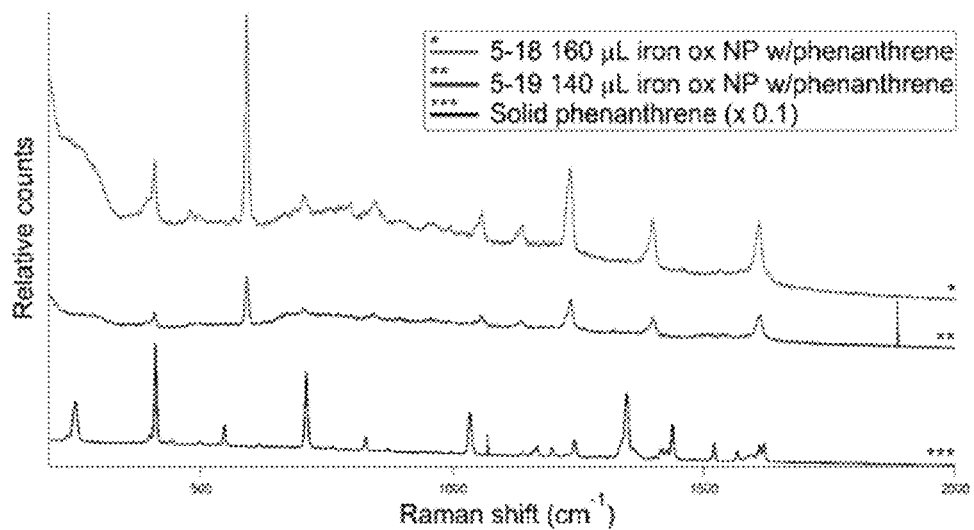
FIG. 8 shows SERS spectra of two SERS substrates prepared according to embodiments of the present application using 160 µL (\*) and 140 µL iron oxide nanoparticles (\*\*) exposed to 1 ppm phenanthrene, compared to a Raman spectrum of bulk (solid) phenanthrene (\*\*\*).

Validation from other analytical methods may be used, for example, to determine what each Raman peak corresponds to in the spectra obtained using the SERS substrates. For example, the spectra can be compared to a Raman spectrum of known materials. FIG. 8 shows the SERS spectra of two SERS substrates prepared according to the general procedure described in Example 1 using different amounts of iron oxide NPs (top spectrum: 160 µL; middle spectrum: 140 µL) exposed to 1 ppm phenanthrene, compared to a Raman spectrum (bottom spectrum) of bulk (solid) phenanthrene.

For qualitative analysis, the spectra can be analyzed to produce a list of wavenumber shifts that correspond to a SERS peak. The peaks can then be used to determine the analyte of question. If the matrix is more complicated, (i.e., more than one analyte), analysis can be more challenging, especially if it is unknown what the sample is composed of. Accordingly, coupling SERS with a more traditional technique can be beneficial in these instances. For example, initially identifying compounds using either gas or liquid chromatography methods can help make Raman band assignment easier in subsequent analyses.

For quantitative analysis of analytes using the magnetically active SERS substrates, SERS spectra of analytes of known concentrations can be collected. A diagnostic peak for the analyte can be identified, and Raman peak area calculated using suitable means such as IGOR Pro software. Peak area vs. concentration curves can be produced, giving a calibration curve for that analyte. Concentrations of unknown analytes in a sample with known analytes can then be determined from only the peak area of its diagnostic peak.

Figure 9:
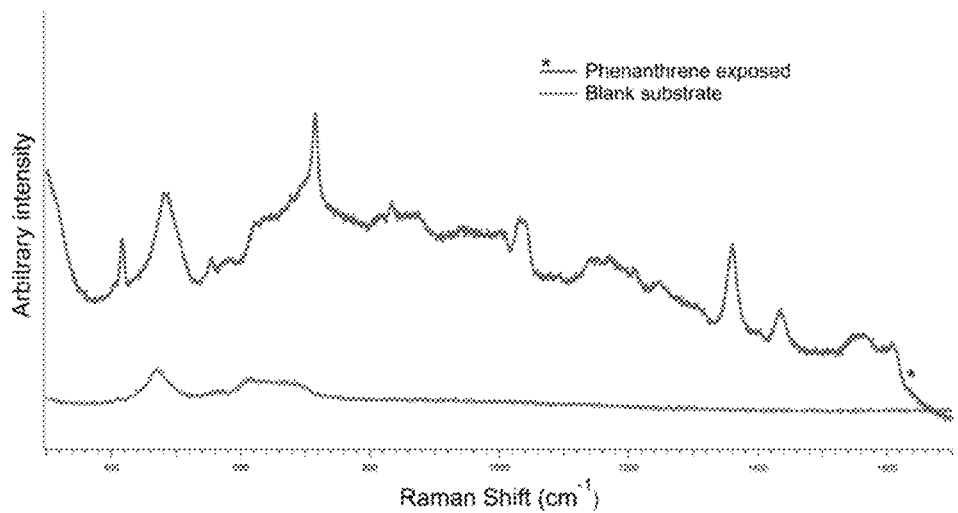
FIG. 9 shows SERS spectra obtained using a SERS substrate according to an embodiment of the present application pre-exposure and post-exposure (\*) to a 1 ppm phenanthrene solution.
Figure 10:
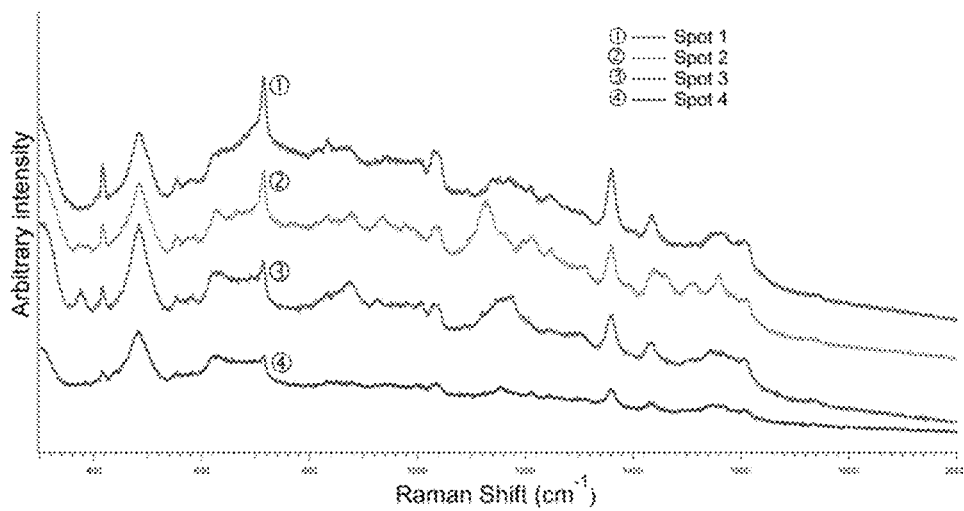
FIG. 10 shows SERS spectra obtained of a 1 ppm phenanthrene solution from four different spots of a SERS substrate that it was deposited on according to an embodiment of the present application.

Spectra were also obtained using SERS substrates of Example 2 in which a volume of analyte solution was dropped on the substrate and allowed to air dry using the same general method described above in respect to the spectra obtained using the SERS substrates of Example 1. This method was used obtain SERS spectra of a 1 ppm phenanthrene solution (FIGS. 9 and 10). FIG. 9 shows a cobalt iron oxide SERS substrate before and after analyte addition. Spectra were also taken across different spots on the substrate, with four spots (1-4) visualized in FIG. 10, which shows consistent analyte signal across the substrate.

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A substrate for surface enhanced Raman spectroscopy (SERS), comprising:
   a support material, wherein the support material is the bottommost layer;
   a layer of a SERS-active metal on the top surface of the support material; and
   an outermost magnetically patterned layer of ferrimagnetically or ferromagnetically active nanoparticles on the top surface of the layer of the SERS-active metal,
   wherein the support material comprises a flat area and the layer of the SERS-active metal is on the top surface of the flat area.

2. The SERS substrate of claim 1, wherein the support material comprises glass or plastic.

3. The SERS substrate of claim 1, wherein the SERS-active metal is gold, platinum, silver or copper.

4. The SERS substrate of claim 3, wherein the SERS-active metal is gold.

5. The SERS substrate of claim 1, wherein the layer of the SERS-active metal has a thickness of from about 2.5 nm to about 7.5 nm.

6. The SERS substrate of claim 1, wherein the ferrimagnetically or ferromagnetically active nanoparticles comprise iron oxide and have an average diameter of about 100 nm or less.

7. The SERS substrate of claim 1, wherein the ferrimagnetically or ferromagnetically active nanoparticles are capped.

8. The SERS substrate of claim 7, wherein the substrate comprises ferrimagnetically active nanoparticles that are capped and the ferrimagnetically active nanoparticles are ferrimagnetic iron oxide nanoparticles.

9. The SERS substrate of claim 1, wherein the ferrimagnetically or ferromagnetically active nanoparticles are uncapped.

10. The SERS substrate of claim 9, wherein the substrate comprises ferrimagnetically active nanoparticles that are uncapped and the ferrimagnetically active nanoparticles are ferrimagnetic cobalt iron oxide nanoparticles.

11. The SERS substrate of claim 1, wherein the outermost magnetically patterned layer of the ferrimagnetically or ferromagnetically active nanoparticles has a thickness such that a Raman spectrum of the SERS substrate does not show any detectable bands corresponding to the support material.

12. A method for detecting an analyte in a sample, the method comprising:
   contacting a SERS substrate as defined in claim 1 with the sample to adhere the analyte to the SERS substrate;
   obtaining a SERS spectrum of the analyte adhered to the SERS substrate; and
   analyzing the spectrum to detect the analyte.

13. The method of claim 12, wherein the sample is wastewater or drinking water.

14. The substrate of claim 1, wherein the layer of the SERS-active metal is annealed to the support material.

15. A method of preparing a substrate for surface enhanced Raman spectroscopy (SERS), the method comprising:
   depositing a layer of a SERS-active metal on the top surface of a support material,
   wherein the support material is the bottommost layer; and
   depositing an outermost magnetically patterned layer ferrimagnetically or ferromagnetically active nanoparticles on the top surface of the layer of the SERS-active metal,
   wherein the support material comprises a flat area and the layer of the SERS-active metal is deposited on the top surface of the flat area.

16. The method of claim 15, wherein the method further comprises annealing the SERS-active metal prior to depositing the outermost magnetically patterned layer of the ferrimagnetically or ferromagnetically active nanoparticles thereon.

17. The method of claim 15, wherein the outermost magnetically patterned layer of ferrimagnetically or ferromagnetically active nanoparticles is deposited on the top surface of the layer of the SERS-active metal by a method comprising:
    depositing a portion of a suspension comprising ferrimagnetically or ferromagnetically active nanoparticles and a solvent on the top surface of the layer of SERS-active metal using a strong permanent magnet;
    evaporating the solvent; and
    repeating the depositing and evaporating until an outermost magnetically patterned layer of ferrimagnetically or ferromagnetically active nanoparticles of a desired thickness has been deposited on the top surface of the layer of SERS-active metal.

18. The method of claim 15, wherein the method comprises depositing ferrimagnetically active nanoparticles, and the ferrimagnetically active nanoparticles are ferrimagnetic iron oxide nanoparticles having an average diameter of from about 30 nm to about 60 nm and wherein the method further comprises capping the ferrimagnetically active nanoparticles prior to deposition on the layer of the SERS-active metal.

19. The method of claim 15, wherein the method comprises depositing ferrimagnetically active nanoparticles, and the ferrimagnetically active nanoparticles are ferrimagnetic cobalt iron oxide nanoparticles, wherein the majority of the magnetically active nanoparticles have a diameter of from about 30 nm to about 60 nm, and wherein the nanoparticles are uncapped and the method is devoid of a capping step.

* * * * *